(12) United States Patent
Young et al.

(10) Patent No.: US 6,279,713 B1
(45) Date of Patent: Aug. 28, 2001

(54) PARKING PAWL ASSEMBLY

(75) Inventors: Colin Jeffrey Young, Dearborn; Matthew Luke Fyie, Westland; Ernie J. Devincent, Northville, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/505,972

(22) Filed: Feb. 17, 2000

(51) Int. Cl.$^7$ .............................. B60T 1/06; B60K 41/26
(52) U.S. Cl. .............................. 192/219.5; 188/31
(58) Field of Search ...................... 192/219.5, 219.4; 188/31, 60, 69; 74/577 R, 577 S

(56) References Cited

U.S. PATENT DOCUMENTS

| 4,157,745 | * | 6/1979 | Nelson | 188/31 |
|---|---|---|---|---|
| 4,267,748 | * | 5/1981 | Grunewald et al. | 74/577 S X |
| 6,105,459 | * | 8/2000 | Troiano | 74/542 |

FOREIGN PATENT DOCUMENTS 58-207572 * 12/1983 (JP) .................. 192/219.2

* cited by examiner

Primary Examiner—Rodney H. Bonck
(74) Attorney, Agent, or Firm—Visteon Global Technologies Inc

(57) ABSTRACT

A parking pawl assembly 10 is provided for use in combination with a vehicle of the type including a transmission assembly 12 having a park gear 16. Assembly 10 includes a pawl member 22 which is selectively movable and which allows the park gear 16 to rotate while pawl member 22 is being disengaged from the park gear 16, thereby gradually and smoothly releasing residual torque stored within the park gear 16.

11 Claims, 3 Drawing Sheets

PARKING PAWL ASSEMBLY

FIELD OF THE INVENTION

This invention relates to a parking pawl assembly and more particularly, to a selectively movable parking pawl assembly which provides a relatively quiet and smooth release of torque when the vehicle is shifted out of the "parked" position.

BACKGROUND OF THE INVENTION

Parking pawl assemblies are used in automotive vehicles to operatively engage the vehicle's park gear, thereby maintaining the vehicle in a "parked" position or state. Parking pawl assemblies typically include a rotatable member or a "parking pawl," which is selectively engaged by the park rod of the vehicle when the transmission of the vehicle is shifted into the "parked" position. When the park rod engages the parking pawl, the parking pawl pivots or rotates into a position where it is disposed between a pair of teeth on the park gear, thereby substantially preventing the park gear and the output shaft from further rotating. A return spring is typically connected to the parking pawl and causes the parking pawl to disengage from the park gear when the park rod is retracted (i.e., when the vehicle is shifted out of the "parked" position).

While these prior parking pawl assemblies are effective to prevent further rotation of the park gear and the output shaft when a vehicle is in the "parked" position, they suffer from some drawbacks. For example and without limitation, when residual torque remains within the output shaft (e.g., when the vehicle is parked on an inclined or declined surface), the park gear imparts a torsional force or load on the parking pawl. The parking pawl holds the park gear in a fixed angular position until the parking pawl is completely disengaged from the park gear (e.g., when the vehicle is shifted out of the "parked" position). Once the parking pawl is completely disengaged from the park gear, the residual torque remaining within the output shaft is rapidly released and is effective to cause the park gear to relatively rapidly rotate or move. This relative rapid release of torque and the relative rapid movement of the park gear generates an undesirable and relatively loud and unaesthetic noise or sound, which is audible within the passenger compartment of the vehicle and can be heard by the occupants of the vehicle. Additionally, this rapid release of torque often results in undesirable vibrations which can be "felt" or experienced at the vehicle's shifter.

There is therefore a need for a new and improved parking pawl assembly for use in a vehicle which overcomes many, if not all, of the previously delineated drawbacks of such prior parking pawl assemblies.

SUMMARY OF THE INVENTION

It is a first object of the invention to provide a parking pawl assembly which overcomes at least some of the previously delineated drawbacks of prior parking pawl assemblies.

It is a second object of the invention to provide a parking pawl assembly which substantially reduces the amount of residual torque which is stored within the park gear before the parking pawl is completely disengaged from the park gear.

It is a third object of the invention to provide a parking pawl assembly which allows the parking gear to move angularly before the parking pawl is completely disengaged from the park gear.

It is a fourth object of the invention to provide a parking pawl assembly for use in a vehicle which substantially reduces the amount of noise and vibration generated when a vehicle is shifted out of the "parked" position.

According to a first aspect of the invention, a parking pawl assembly for use in combination with a gear and a torque producing output shaft is provided. The parking pawl assembly includes a member which is movable between a first gear engagement position and a second position. The member has a portion which controllably releases the torque produced by the output shaft as the member is moved from the first gear engagement position to the second position.

According to a second aspect of the invention, a method for use in combination with a parking pawl of the type adapted to selectively engage and disengage a gear which is connected to a torque producing output shaft is provided. The method is effective to release the torque and includes the steps of selectively allowing the parking pawl to move in response to the torque, thereby smoothly releasing the torque.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
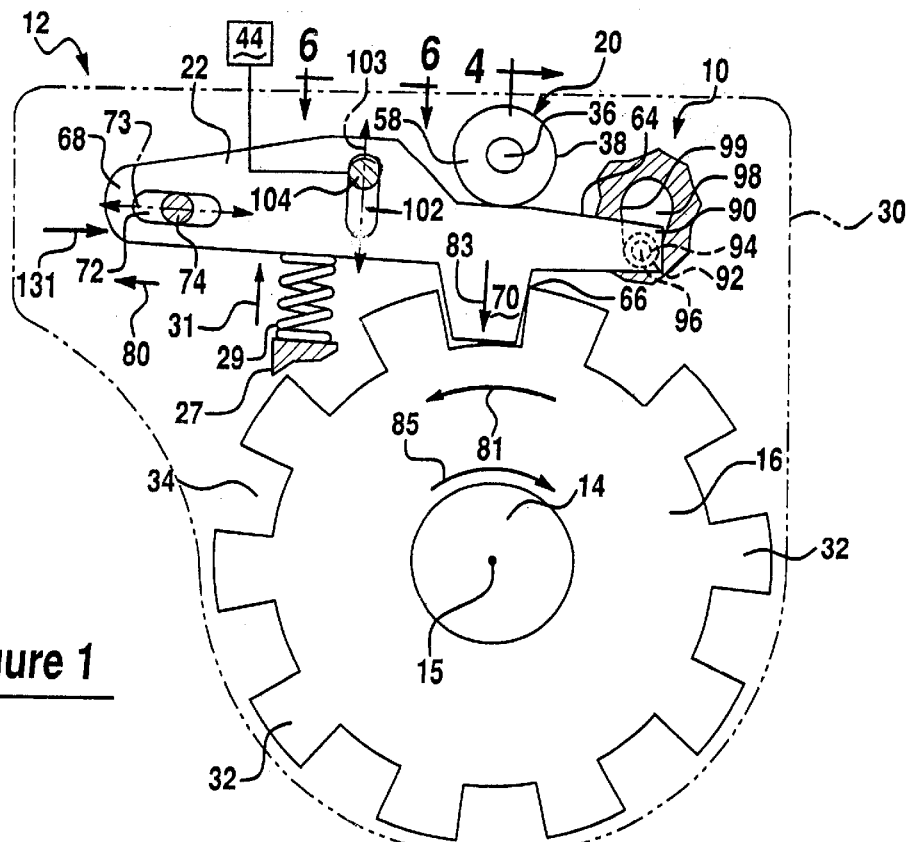
FIG. 1 is partial front view of a parking pawl assembly, which is made in accordance with the teachings of the preferred embodiment of the invention, which is deployed within a conventional transmission, and which illustrates the parking pawl in a first "engaged" or "locked" position.

Referring now to FIGS. 1–6, there is shown a parking pawl assembly 10, which is made in accordance with the teachings of the preferred embodiment of the invention. Assembly 10 is adapted for use in combination with a vehicle of the type having a transmission assembly 12, an output shaft 14, which provides an output torque from the vehicle's engine, a park gear 16, which is coupled to output shaft 14, a shifter or shifting assembly 18, and a park rod 20, which is coupled to shifting assembly 18. Shifting assembly 18 is operatively and selectively movable between several positions, such as a "park" position, a "reverse" position, a "neutral" position, and a "drive" position, which respectively correspond to various operating states or operating modes of the vehicle. Shifting assembly 18 selectively actuates or "extends" park rod 20 in a known and conventional manner when the vehicle is shifted into park and further selectively actuates or "retracts" park rod 20 in a known and conventional manner when the vehicle is shifted from park to reverse (or to any other position).

Parking pawl assembly 10 includes a selectively and pivotally movable pawl member 22, a return spring 29 compressibly and retractably engages pawl member 22, a fixed pin member 74, and a generally circular "wheel", rolling member or roller 92. As described more fully and completely below, parking pawl assembly 10 allows park gear 16 to rotate during disengagement with pawl member 22, thereby allowing residual torque within the output shaft to be relatively smoothly, gradually, and quietly released.

Transmission assembly 12 is a conventional and commercially available transmission assembly having a housing 30 which operatively contains the various components of the transmission assembly 12, including but not limited to parking pawl assembly 10, output shaft 14, park gear 16, and park rod 20.

Park gear 16 is a conventional park gear which is fixedly coupled to the vehicle's output shaft 14, and which selectively rotates with output shaft 14 about the longitudinal axis 15 of output shaft 14. Park gear 16 includes a plurality of peripherally disposed and substantially identical teeth or projecting portions 32. Each tooth 32 is separated by a cavity or recessed portion 34. As described more fully and completely below, when shifter 18 is moved to the "park" position, pawl member 22 selectively engages and/or resides within a unique one of cavities 34, thereby substantially preventing the output shaft 14 and the park gear 16 from rotating, and maintaining the vehicle in a stationary or "parked" position.

Figure 4:
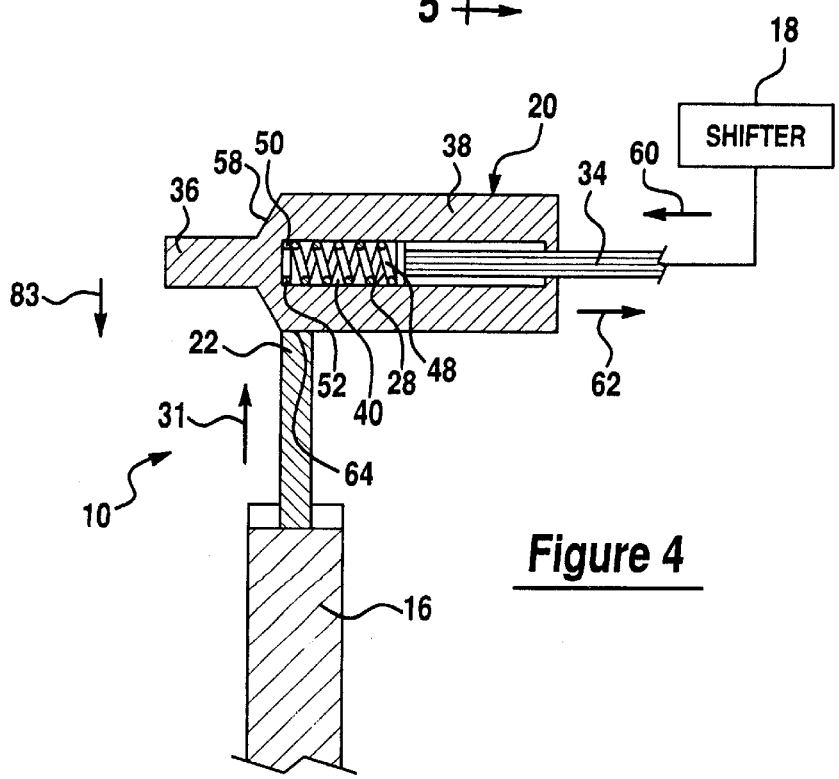
FIG. 4 is a partial sectional view of the parking pawl assembly shown in FIG. 1 and which is taken along view 4—4.

As best shown in FIG. 4, park rod 20 is a conventional and generally elongated park rod. Park rod 20 includes a "narrow" portion 36, a "widened" and generally cylindrical portion 38 having an interior cavity or channel 40, a spring member 28 which is operatively disposed within channel 40, and a "sloped", tapered, and/or conical portion 58 which is adjacent to and integrally formed with portions 36 and 38. Park rod 20 further includes a bottom portion 34 which is connected to shifter 18, which is slidably disposed within channel 40, and which abuttingly engages end 48 of spring member 28. End 50 of spring member 28 abuts the top end 52 of channel 40. Park rod 20 is selectively movable in the directions of arrows 60 and 62 in a conventional manner by use of shifting assembly 18. As explained more fully and completely below, when the shifting assembly 18 is moved into the "park" position, rod 20 moves in the direction of arrow 60 from the position illustrated in FIG. 5 to the position illustrated in FIG. 4.

As shown best in FIG. 1, pawl member 22 includes a rod engaging side or surface 64, which abuttingly engages park rod 20, a gear engaging side or surface 66, a generally rounded end portion 68, and a generally rectangular end portion 90. Gear engaging side or surface 66 includes a generally rectangular tooth or projecting portion 70 which selectively engages park gear 16.

End portion 68 includes a generally elongated slotted aperture or channel 72 having a longitudinal axis of symmetry 73. End portion 68 is pivotally and slidably coupled to a stationary rod or pin 74 which is integrally formed with housing 30 of transmission assembly 12 and which operatively extends through aperture 72.

Figure 2:
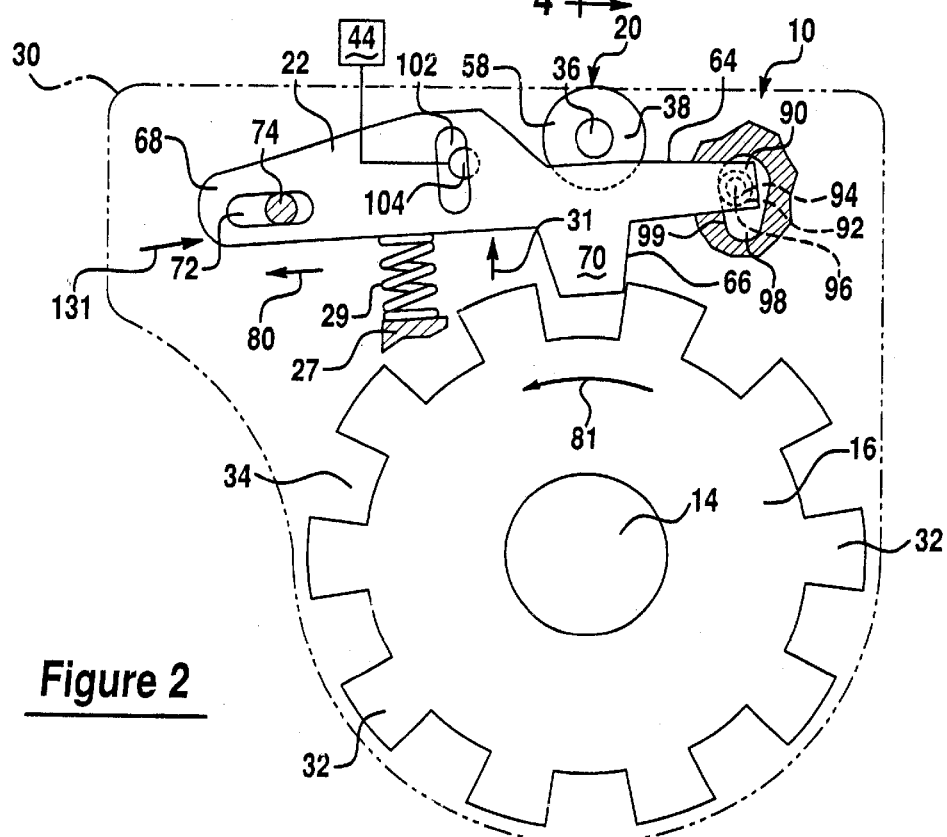
FIG. 2 is a partial front view of the parking pawl assembly shown in FIG. 1 with the parking pawl shown in a second "partially engaged" position.
Figure 3:
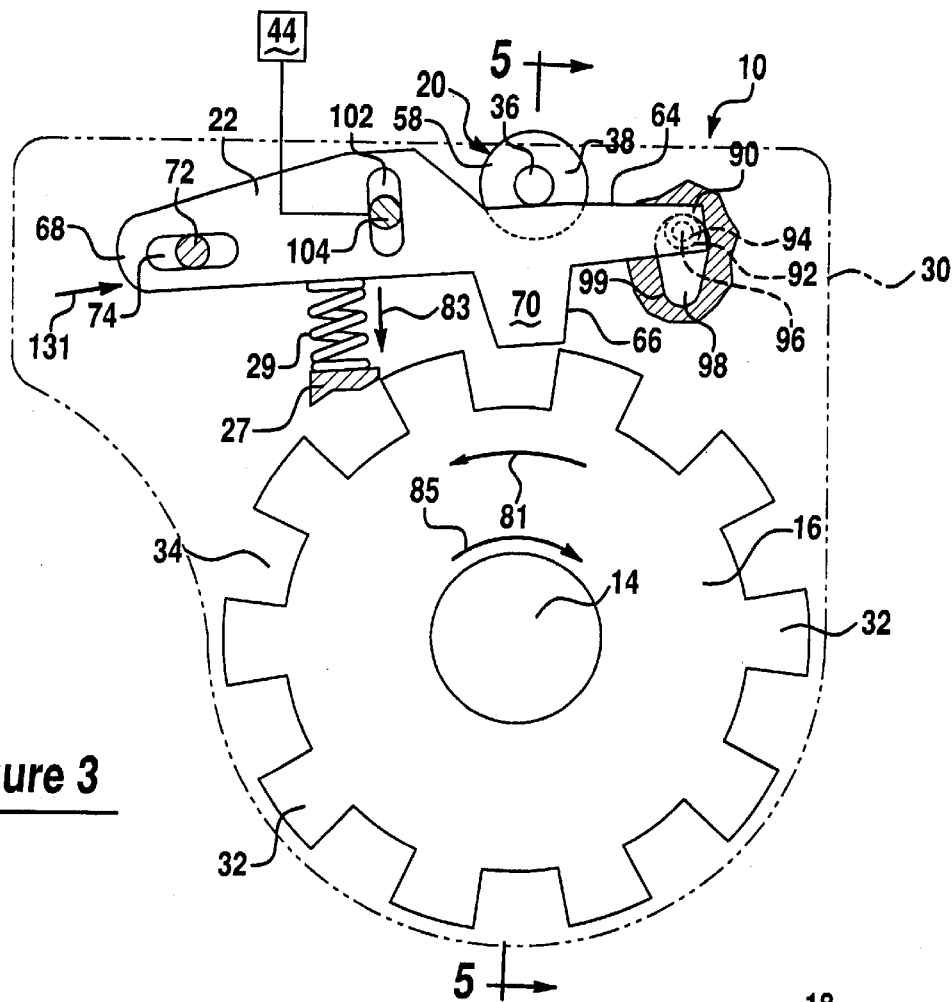
FIG. 3 is a partial front view of the parking pawl assembly shown in FIG. 1 in a third "disengaged" position or state.

Parking pawl 22 further includes a generally elongated aperture or channel 102 having an axis of symmetry 103 which is disposed in a substantially perpendicular relationship to axis 73. Retractable rod or pin 104 operatively and selectively extends through and engages aperture 102 when shifter assembly 18 is moved, as described more fully and completely below. As shown best in FIG. 6, pin 104 is operatively coupled to a conventional motor/controller 44 which selectively and operatively actuates (e.g., retracts and extends) pin 104 in the directions illustrated by arrows 106 and 108. In this manner, pin 104 is selectively movable between a first position in which pin 104 extends through aperture 102, as shown in FIGS. 1 and 3, and a second position in which rod 104 is removed from aperture 102, as shown in FIG. 2. It should be appreciated that in alternate embodiments any suitable type of mechanical or electromechanical device, assembly, and/or method may be employed by assembly 10 to selectively retract and extend pin 104.

End portion 90 includes wheel, rolling member or roller 92 which selectively rotates around longitudinal axis 96 and which is connected to parking pawl 22 by use of a conventional pin, dowel or fastener 94 which is connected to end portion 90. Roller 92 is movably disposed within an aperture or "glide slot" 98 which includes a curved surface 99 which is integrally formed with housing 30, and which engages the outer surface of roller 92.

Return spring 29 is a conventional coil type compression spring. Spring 29 is coupled to portion 27 of transmission housing 30 and abuttingly engages parking pawl member 22, thereby providing and/or imparting a force upon member 22 in the direction illustrated by arrow 31. It should be appreciated that in other alternate embodiments, spring 29 may comprise a single return spring and/or other type of spring which selectively provides a force in a direction similar to that illustrated by arrow 31.

Figure 5:
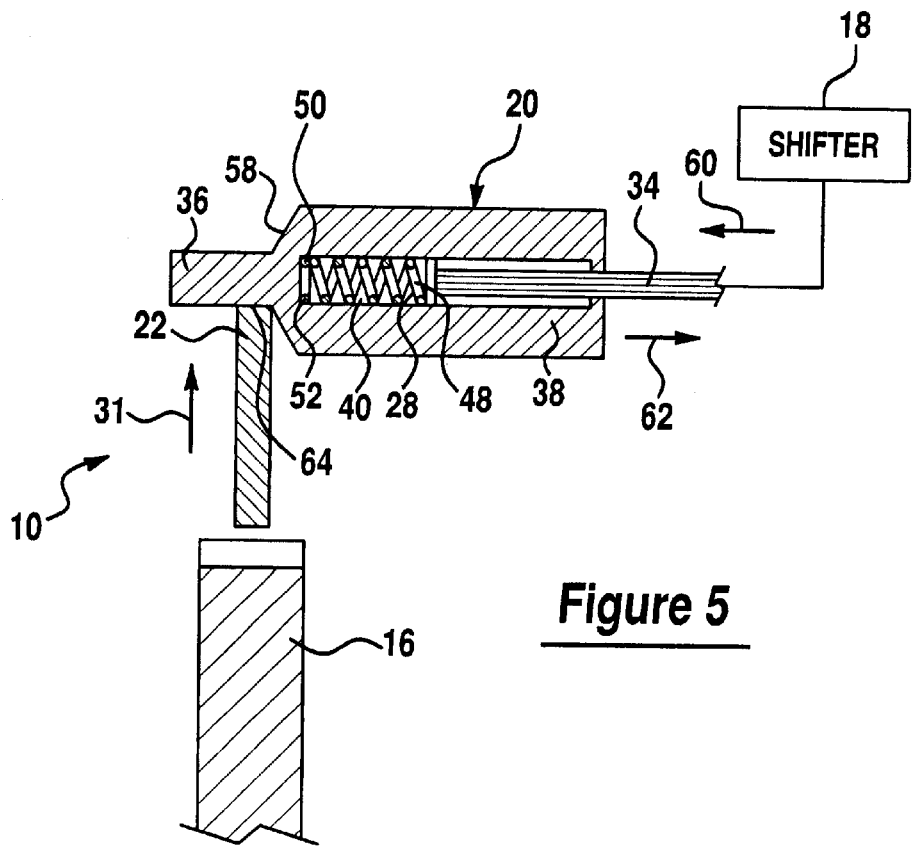
FIG. 5 is a partial sectional view of the parking pawl assembly shown in FIG. 3 and which is taken along view 5—5.
Figure 6:
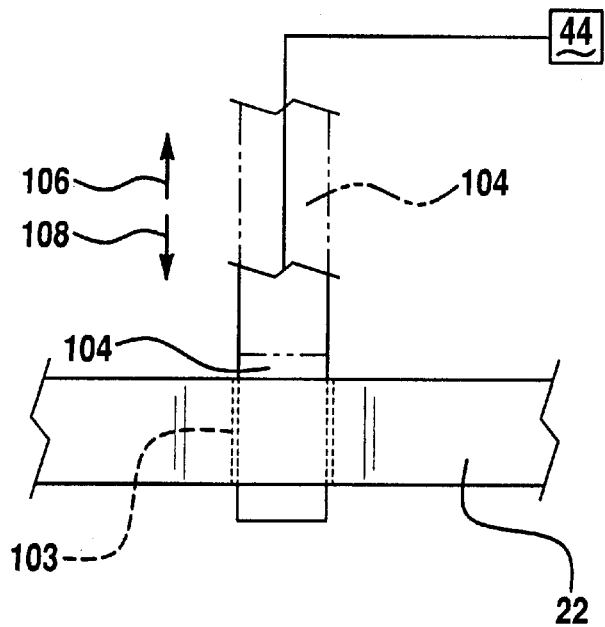
FIG. 6 is a partial top view of the parking pawl assembly shown in FIG. 1 which is taken along view line 6—6 and which illustrates the selective engagement of a retractable pin member employed within the parking pawl assembly.

In operation, parking pawl assembly 10 resides in the position illustrated in FIGS. 3 and 5 when the vehicle is in an operating state or condition other than park (e.g., if the vehicle is in reverse, neutral or drive). When assembly 10 resides in this position, portion 36 of park rod 20 abuttingly engages surface 64 of parking pawl 22, due to the force provided by return spring 29. As illustrated in FIGS. 3 and 5, when the transmission assembly 12 is not in the "park" position, tooth or wheel engaging portion 70 of pawl member 22 does not contact park gear 16.

When the vehicle and/or transmission 12 is shifted into the "park" position, shifter 18 causes the park rod 20 to move in the direction illustrated by arrow 60. As rod 20 moves in the direction of arrow 60, conical portion 58 engages side 64 of pawl member 22. The engagement between portion 58 and member 22 imparts a force upon member 22 in the direction illustrated by arrow 83, thereby causing member 22 to move or pivot in the direction of arrow 83 until member 22 is fully engaged with park gear 16 as shown in FIG. 1.

Once the vehicle has been shifted into "park", any residual torque remaining within the output shaft 14 and/or any "rolling" movements of the vehicle or vehicle tires, will impart a rotational force on the output shaft 14 and the park gear 16 in the direction of either arrow 81 or arrow 85. The engagement between portion 70 of parking pawl member 22 and teeth 32 prevents park gear 16 from rotating, thereby causing residual torque to remain within gear 16 and output shaft 18. It should be appreciated that pin 104, which remains inserted within aperture 102 when the vehicle is in "park", prevents pawl member 22 from moving in the direction of arrow 80 or arrow 131, and is thus effective to prevent the rotation of park gear 16 when member 22 is engaged with park gear 16.

When the vehicle and/or transmission is shifted out of the "park" position, shifter 18 moves park rod 20 in the direction of arrow 62. As rod 20 moves in the direction of arrow 62, pin 104 is selectively retracted from aperture 102 by controller/motor 44. As tapered portion 58 of rod 20 engages member 22, the force provided by return spring 29 moves member 22 in the direction of arrow 31, thereby causing member 22 to pivot or rotate away from gear 16. As best shown in FIG. 2, once pin 104 is removed from slot 102, member 22 is allowed to move "laterally" or in the direction of arrow 80 (e.g., when the residual torque is in the direction of arrow 81). It should be appreciated that when the residual torque in the output shaft causes gear 16 to move in the direction of arrow 85, member 22 will move in the direction of arrow 131 when pin 104 is removed from slot 102.

As member 22 shifts or moves in the direction of arrow 80, park gear 16 is allowed to rotate in the direction illustrated by arrow 81, while roller 92 selectively engages and/or "rolls" along surface 99 of guide slot 98. Roller 92 is effective to restrict or control the movement of parking pawl 22 in the direction of 80, and further absorbs and/or transfers the load released by the rotation or movement of park gear 16 to the surface 99 while the portion 70 disengages from slot 34. In this manner, gear 16 is allowed to rotate in a controlled and gradual manner while member 22 is being disengaged, thereby gradually and smoothly releasing the residual torque within output shaft 18 and park gear 16.

When the parking pawl 22 has completely disengaged from the park gear 16, the force provided by spring 29 and the engagement between roller 92 and the top portion of slot 98 cooperatively cause pawl member 22 to shift back into its "original" or "centered" position, as shown in FIG. 3, and motor/controller 44 actuates and/or extends pin 104 into aperture 102.

In this manner, each time shifter assembly 18 is shifted out of the park position, a portion of the residual torque stored within the parking gear 16 and the output shaft 14 is smoothly and gradually released prior to the complete disengagement of parking pawl 22 from park gear 16. Additionally, the function of parking pawl assembly 10 further ensures that pawl member 22 will disengage park gear 16 in a manner which substantially reduces and/or eliminates any undesirable noise, sound or vibration associated with prior parking pawl assemblies.

It is to be understood that the invention is not to be limited to the exact construction and/or method which has been illustrated and discussed above, but that various changes and/or modifications may be made without departing from the spirit and the scope of the invention.

What is claimed is:

1. A parking pawl assembly for use in combination with a gear which is operatively contained within a housing and a torque producing output shaft, said parking pawl assembly comprising:

a member which is movable between a first gear engagement position and a second position, and a roller which is coupled to said member and which engages a slot contained within said housing, said engagement of said roller and said slot being effective to gradually release said torque produced by said output shaft as said member is moved from said first gear engagement position to said second position.

2. The parking pawl assembly of claim 1 further comprising a spring which is coupled to said member and which selectively imparts a force on said member effective to cause said member to move from said first gear engagement position to said second position.

3. The parking pawl assembly of claim 1 wherein said member includes an aperture and further comprising a selectively actuatable rod which selectively engages said aperture, said rod being effective to substantially prevent said torque from being released when said rod is engaged with said aperture.

4. The parking pawl assembly of claim 3 wherein said rod is coupled to a controller which selectively actuates said rod.

5. The parking pawl assembly of claim 3 wherein said aperture is generally elongated.

6. The parking pawl assembly of claim 1 wherein said member includes a longitudinal slot and is slidably and pivotally coupled to a pin member which extends through said longitudinal slot.

7. A parking assembly comprising:

a park gear having an amount of residual torque;

a park rod which is selectively actuatable;

a pawl member having a slot, said pawl member being selectively movable between a first position in which said pawl member is remote from said park gear, and a second position in which said pawl member engages said park gear, said pawl member being movable from said first position to said second position in response to said actuation of said park rod, said pawl member being further slidably movable from a third position to a fourth position, said movement from said third position to said fourth position being effective to smoothly release said amount of torque from said park gear; and a selectively movable control pin which selectively engages and disengages said slot of said pawl member, said control pin being effective to allow said pawl member to slidably move from said third position to said fourth position when said control pin is disengaged from said slot.

8. The parking pawl assembly of claim 7 wherein said control pin is coupled to a motor which selectively actuates said control pin, thereby causing said control pin to selectively engage and disengage said slot.

9. The parking pawl assembly of claim 7 wherein said control pin is disengaged from said slot when said shifter is moved out of said park position.

10. The parking pawl assembly of claim 7 further comprising a return spring which is coupled to said pawl member and which selectively causes said pawl member to move from said first to said second position.

11. The parking pawl assembly of claim 7 wherein said pawl member is slidably and pivotally coupled to a rod which extends through a longitudinal slot which is integrally formed within said pawl member and which allows said pawl member to move between said third and said fourth position.

* * * * *